(12) United States Patent
Jovicic et al.

(10) Patent No.: US 8,514,131 B2
(45) Date of Patent: Aug. 20, 2013

(54) METHODS AND APPARATUS FOR INCREASING THE RELIABILITY OF SIGNAL REFERENCE MAPS FOR USE IN POSITION DETERMINATION

(75) Inventors: Aleksandar Jovicic, Jersey City, NJ (US); Cyril Measson, Somerville, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 12/875,427

(22) Filed: Sep. 3, 2010

(65) Prior Publication Data
US 2012/0056785 A1   Mar. 8, 2012

(51) Int. Cl.
*G01S 5/02* (2010.01)
(52) U.S. Cl.
CPC .................................. *G01S 5/0252* (2013.01)
USPC ....................................................... 342/451
(58) Field of Classification Search
CPC ...................................................... G01S 5/0252
USPC ....................................................... 342/451
See application file for complete search history.

(56) References Cited

U.S. PATENT DOCUMENTS

| | | | |
|---|---|---|---|
| 6,393,294 B1 * | 5/2002 | Perez-Breva et al. | 455/456.5 |
| 6,496,701 B1 * | 12/2002 | Chen et al. | 455/456.5 |
| 6,782,265 B2 | 8/2004 | Perez-Breva et al. | |
| 7,167,714 B2 * | 1/2007 | Dressler et al. | 455/456.1 |
| 7,346,359 B2 | 3/2008 | Damarla et al. | |
| 7,433,693 B2 | 10/2008 | Sheynblat | |
| 2001/0022558 A1 * | 9/2001 | Karr et al. | 342/450 |

OTHER PUBLICATIONS

Bosisio, Ada Vittoria, "RSSI—based localization and tracking algorithm for indoor environments", IEEE Xplore 2009, pp. 469-472.

* cited by examiner

*Primary Examiner* — Gregory C Issing
(74) *Attorney, Agent, or Firm* — James K. O'Hare

(57) ABSTRACT

A mobile wireless device receives a set of fingerprint prediction maps, e.g., RF signal prediction maps, and corresponding probability metrics, e.g., indicative of map reliability. A fingerprint prediction map is an expected signal measurement map corresponding to a parameter or parameters to be measured and a area given a set of expected conditions. At different times, e.g., due to different conditions, a different map in the set of fingerprint prediction maps may be more likely to be accurate. The mobile wireless device updates the probability metrics, associated with different alternative maps in the set of maps, as a function of one or more of: known information, sensor readings, measurements, detected information, and position determination. The mobile wireless device determines its current position using fingerprint predication maps and one or more updated probability metrics.

25 Claims, 11 Drawing Sheets

METHODS AND APPARATUS FOR INCREASING THE RELIABILITY OF SIGNAL REFERENCE MAPS FOR USE IN POSITION DETERMINATION

FIELD

Various embodiments relate to wireless communications, and more particularly, to methods and apparatus related to mobile device position determination.

BACKGROUND

Mobile devices may determine their location based on the strength of signals received from devices at fixed locations, e.g., Access Points, sometimes referred to as Anchor Points since the fixed location devices and the strength of signals therefrom provide mobile devices information from which they can estimate their location. In order for mobile location determinations to be accurate, mobiles may rely on power reference maps which include expected received signal power at various geographic locations. In this way a device can determine its location from received signals.

Unfortunately, received signal power can vary at a location based on a host of factors. These factors may include the number of users, weather conditions, potential changes in a building structure, e.g., the opening or closing of a door on a floor of a building. Accordingly the use of a simple power reference map to determine, e.g., a device's location within a building, may lead to far less accurate results then may be desired.

The efficiency of methods based on fingerprint prediction maps (e.g., signal power reference maps) relies heavily on the map accuracy. Accordingly, devices are confronted with the fact that the fingerprint prediction map (signal power reference map) may also change over time so that at different times or under different conditions more than one fingerprint (expected signal strength) may correspond to a particular geographic region. If not taken into account or not correctly modeled, those potential variations may result in a considered reference map that is inaccurate.

In view of the above, it should be appreciated that in order to make accurate location determinations based on expected signal maps, e.g., signal strength maps, reliable there needs to be methods and/or apparatus that address the issue that a particular power reference map may be more or less reliable than another power reference map at a given time because of changes in one or more conditions. The conditions may include such things as number of users present, mobility of users, changes of building structure due to opening and/or closing of doors, etc. Accordingly, there is a need for methods and apparatus for generating and/or updating map reliability information and/or updating reference map related information.

SUMMARY

A mobile wireless device receives a set of fingerprint prediction maps, and corresponding metrics, e.g. probability metrics. In various embodiments, a fingerprint prediction map is an expected signal measurement map corresponding to one or more parameters to be measured and a particular location site given a set of expected conditions. One exemplary set of fingerprint prediction maps corresponds to expected received RF power measurements, e.g., received signal strength measurements, in a building with each map in the set of maps corresponding to a different set of conditions. Exemplary conditions in the set of conditions include, e.g., time of day, day of week, weather conditions, whether electrically powered equipment is on or off, mobile device density which may be based on detected peer discovery signals, building condition, open or closed status of a door or a window, presence or absence of a structure in a building, etc. At different times, e.g., due to different conditions, a different map in the set of fingerprint prediction maps may be more likely to be accurate. Thus the actual probability that a particular map is accurate at a given point in time depends on the actual conditions at the point in time at which the received signal measurements are made.

In various embodiments, a mobile wireless device updates the metrics, e.g., the probability metrics, associated with different alternative maps in the set of maps, as a function of one or more of: known information, sensor reading, measurements, detected information, and position determination at a given point in time. The mobile wireless device then determines its current position using multiple fingerprint prediction maps and multiple metrics, e.g., multiple updated probability metrics. The mobile wireless device determines its most likely current position as the position determination obtained from the fingerprint prediction map having the highest updated current probability metric value.

An exemplary method of improving the reliability of a position estimate of a mobile wireless device, in accordance with some embodiments, comprises: receiving a set of fingerprint prediction maps including multiple maps and, for each fingerprint prediction map, at least one corresponding metric; determining a position of the mobile wireless device based on multiple fingerprint prediction maps in the set of fingerprint prediction maps and based on the corresponding metrics; and updating the metrics corresponding to the multiple fingerprint maps used to make said position determination based on the result of said position determination. A mobile wireless device, in accordance with some embodiments, comprising: at least one processor configured to: receive a set of fingerprint prediction maps including multiple maps and, for each fingerprint prediction map, at least one corresponding metric; determine a position of the mobile wireless device based on multiple fingerprint prediction maps in the set of fingerprint prediction maps and based on the corresponding metrics; and update the metrics corresponding to the multiple fingerprint maps used to make said position determination based on the result of said position determination. The exemplary mobile wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
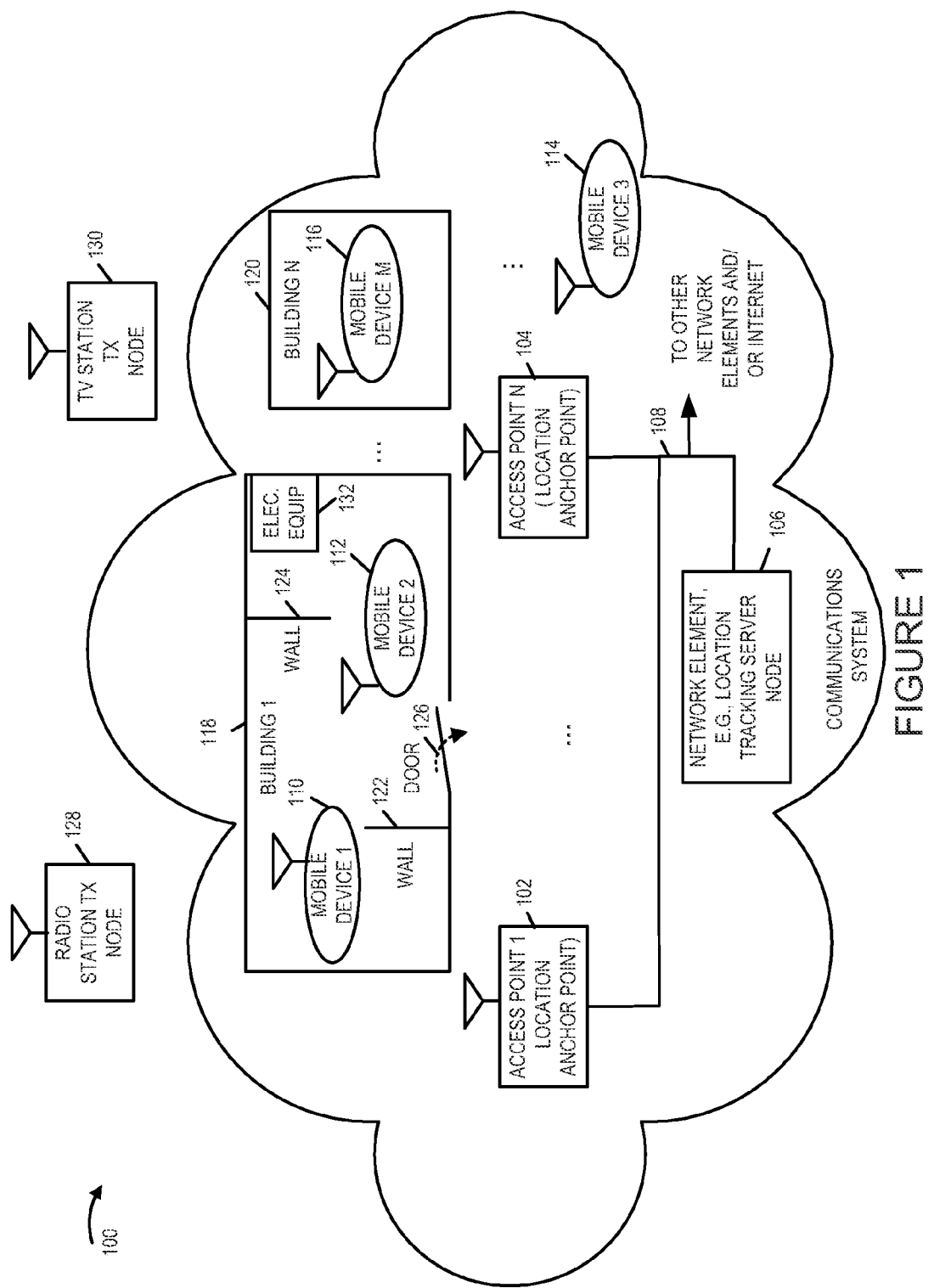
FIG. 1 is a drawing of an exemplary communications system, e.g., a wireless communications system, in accordance with an exemplary embodiment.

FIG. 1 is a drawing of an exemplary wireless communications system 100 in accordance with an exemplary embodiment. Exemplary wireless communications system 100 includes a plurality of access points, e.g., base stations, (access point 1 102, . . . , access point N 104) coupled together and to network element 106, e.g., a mobile wireless device location tracking server node, via backhaul network 108. Network element 106 stores sets of fingerprint prediction maps and corresponding metrics, e.g., probability metrics.

Exemplary wireless communications system 100 also includes a plurality of mobile wireless devices (mobile device 1 110, mobile device 2 112, mobile device 3 114, . . . , mobile device M 116) which may move throughout the system and communicate with one another and with access points. The mobile devices support communications via the access point and peer to peer communications, e.g., direct device to device communications. Thus using peer to peer communications two mobiles may communicate directly with one another.

Mobile wireless communications devices determine their positions and refine the position determinations based on fingerprint prediction maps and corresponding metrics. The access points (102, . . . , 104) serve as fixed location anchor points, e.g., transmitting signals from known locations at known power levels which may be received and used by the mobile wireless devices to obtain a coarse position fix. A mobile wireless device may request and receive a set of fingerprint prediction maps and corresponding metrics, e.g., from network element 106 via an access point. For example, mobile device 1 110 may request and receive a set of RF receive power level fingerprint prediction maps and corresponding metrics corresponding to building 1 118 from network element 106 via access point 1 102.

Throughout the system 100 there are structures such as building 1 118 and building N 120. The structures include elements which impact signal propagation, e.g., fixed elements such as walls (122, 124) and elements which may vary over time, e.g., door 126 which may be open at times and closed at other times. Some of the fixed elements may have changed from the point in time in which the fingerprint prediction maps were generated, e.g., a wall was removed as part of building remodeling. Additional devices in the vicinity of the mobile wireless devices are also transmitting signals which affect the RF environment experienced by the mobile wireless devices, e.g., radio station transmitter node 128, TV station transmitter node 130, and electrical equipment 132 are affecting the RF environment in building 1 118. Some of the transmission power levels corresponding to the additional devices may change over time, e.g., as a TV station transmitter may have a different transmission profile during day and night, as some office equipment is more active during certain times of the work day, etc. In addition, the level of signaling between the mobiles and access points and/or between peer to peer mobiles may change over time, e.g., in relation to mobile density and/or mobile needs. Thus due to expected variations in the environment, one fingerprint prediction may not be adequate to accurately locate a mobile wireless device within building 1 118 at all times.

In accordance with a feature of some embodiments, a mobile wireless device receives and uses multiple alternative fingerprint prediction maps with corresponding metrics to determine its location. In some embodiments, the mobile wireless device uses known information and/or sensed measurements to update the metrics, e.g., probability metrics corresponding to the different alternative maps, and determine its position. In various embodiments, the mobile wireless device determined position and updated metrics, e.g., updated probability metrics, are communicated to another node, e.g., mobile wireless device 1 110 communicates its determined position and updated metrics to network element 106, via access point 1 102.

Figure 2:
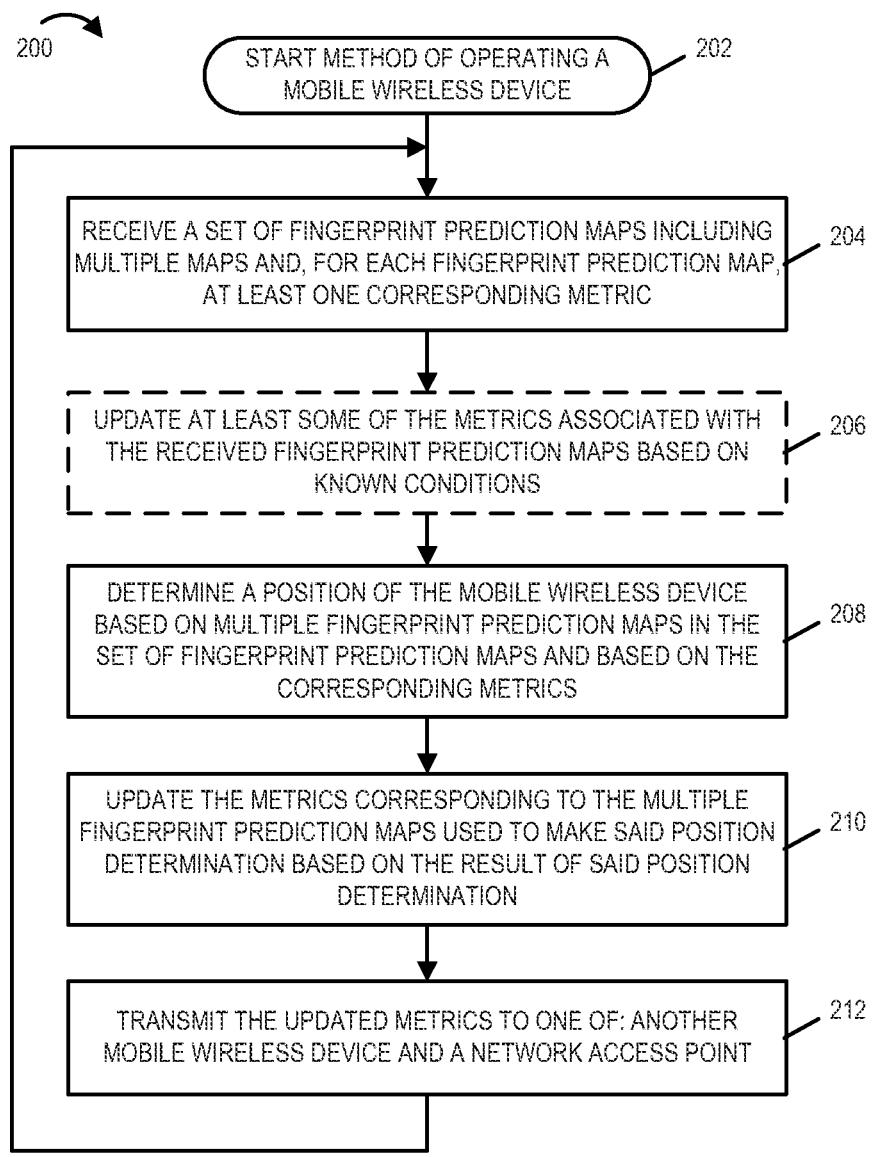
FIG. 2 is a flowchart illustrating exemplary methods of operating a mobile wireless device in accordance with various exemplary embodiments.

FIG. 2 is a flowchart 200 of an exemplary method of operating a mobile wireless device in accordance with an exemplary embodiment. The exemplary method of flowchart 200 improves the reliability of a position estimate of the mobile wireless device. Operation starts in step 202, where the mobile wireless device is powered on and initialized and proceeds to step 204.

In step 204, the mobile wireless device receives a set of fingerprint prediction maps including multiple maps, and for each fingerprint prediction map, at least one corresponding metric. Examples of fingerprint prediction maps include a power/RF fingerprint prediction map, a delay fingerprint prediction map based on distance, a delay fingerprint prediction map based on multipath delay spread, and a visual camera fingerprint prediction map. In some embodiments, the set of fingerprint prediction maps includes fingerprint prediction maps which correspond to at least one of: structural differences in an indoor environment, differences in mobile device density, differences in weather conditions, whether electrically powered equipment is on or off, and different times of day. An exemplary metric is a probability metric. In some embodiments, each metric represents the probability that a fingerprint prediction map corresponding to that metric is valid. Operation proceeds from step 204 to step 206.

In step 206 the mobile wireless device updates at least some of the metrics associated with the received fingerprint prediction maps based on known conditions. For example, the mobile wireless device may update the probability associated with a daytime prediction map if the mobile wireless device knows that the current time is night time. Operation proceeds from step 206 to step 208.

In step 208, the mobile wireless device determines a position of the mobile wireless device based on multiple fingerprint prediction maps and based on the corresponding metrics. In some embodiments, the determination of position is a probabilistic determination. In some embodiments, said determining the position of the mobile device is further based on sensor readings. In some such embodiments, the sensor reading include RF measurement readings, e.g., power measurements and/or delay spread measurements, corresponding to multiple frequencies. In some embodiments, the RF measurements include measurements include at least one of multipath delay spread of a received signal and power of a received signal. In various embodiments, the sensor readings include at least one of: a compass output, a magnetic sensor output, an accelerometer output, and a gyroscope output. In one embodiment there is a fingerprint prediction map corresponding to possible right hand turn locations. Operation proceeds from step 208 to step 210.

In step 210 the mobile wireless device updates the metrics corresponding to the multiple fingerprint prediction maps used to make the position determination based on the result of the position determination. Operation proceeds from step 210 to step 212. In step 212 the mobile wireless device transmits the updated metrics to one of: another mobile wireless device and a network access point. The transmitted updated metrics, in some embodiments, are used in updating metrics associated with the maps stored in the network. Operation proceeds from step 212 to step 204.

Figure 3:
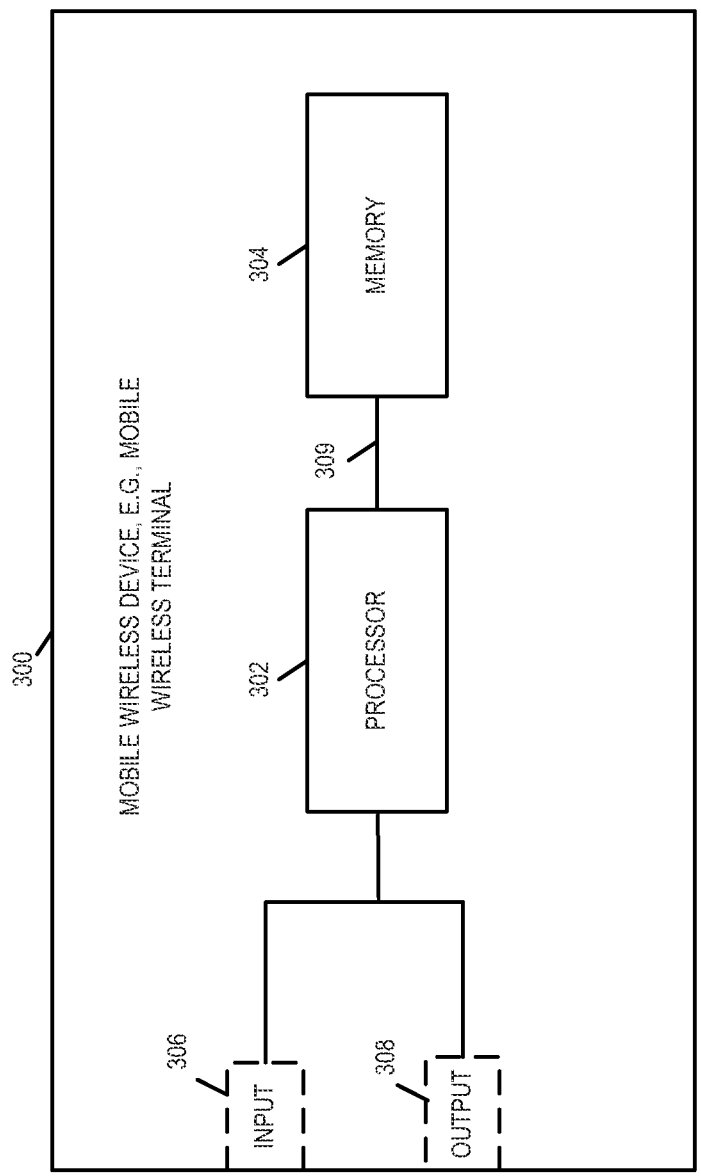
FIG. 3 is a drawing of an exemplary mobile wireless device in accordance with an exemplary embodiment.

FIG. 3 is a drawing of an exemplary mobile wireless device, e.g., a mobile wireless terminal, in accordance with an exemplary embodiment. Exemplary mobile wireless device 300 is, e.g., one of the mobile wireless devices of system 100 of FIG. 1. Exemplary mobile wireless device 300 may, and sometimes does, implement a method in accordance with flowchart 200 of FIG. 2.

Mobile wireless device 300 includes a processor 302 and memory 304 coupled together via a bus 309 over which the various elements (302, 304) may interchange data and information. Mobile wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a set of fingerprint prediction maps including multiple maps and, for each fingerprint prediction map, at least one corresponding metric. Processor 302, in some embodiments is further configured to update at least some of the metrics associated with the received fingerprint prediction maps based on known conditions, prior to determining said position.

Processor 302 is configured to determine a position of the mobile wireless device based on multiple fingerprint prediction maps in the set of fingerprint prediction maps and based on the corresponding metrics. In some embodiments, each metric represents the probability that a fingerprint prediction map corresponding to that metric is currently valid. In various embodiments, the determination of position is a probabilistic determination. In some embodiments, the set of fingerprint prediction maps includes fingerprint prediction maps which correspond to at least one of: structural differences in an indoor environment, differences in mobile device density, weather conditions, whether electrically powered equipment is on or off, and different times of day.

In some embodiments, processor 302 is configured to determine the position of the mobile wireless device based on sensor readings as part of being configured to determine the position. In some embodiments, said sensor readings include RF measurement readings corresponding to multiple frequencies. The RF measurements are, e.g., of power measurements and/or delay spread measurements. In some embodiments RF measurements include at least one of multipath delay spread measurements of a received signal and power measurements of a received signal. For example, there may be a power map corresponding to multipath delay spread. In some embodiments, there may be a power map corresponding to distance based delay.

In some embodiments, said sensor readings include at least one of: a compass output, a magnetic sensor output, an accelerometer output and a gyroscope output. For example, there could be a map of possible right hand turn locations which makes use of compass output and/or gyroscope output sensor readings.

Processor 302 is further configured to update the metrics corresponding to the multiple fingerprint maps used to make said position determination based on the result of said position determination. Processor 302, in some embodiments, is further configured to transmit the updated metrics to one of: another mobile wireless device and a network access point. The transmitted updated metrics are used, e.g. in updating metrics associated with the maps stored in the network.

Figure 4:
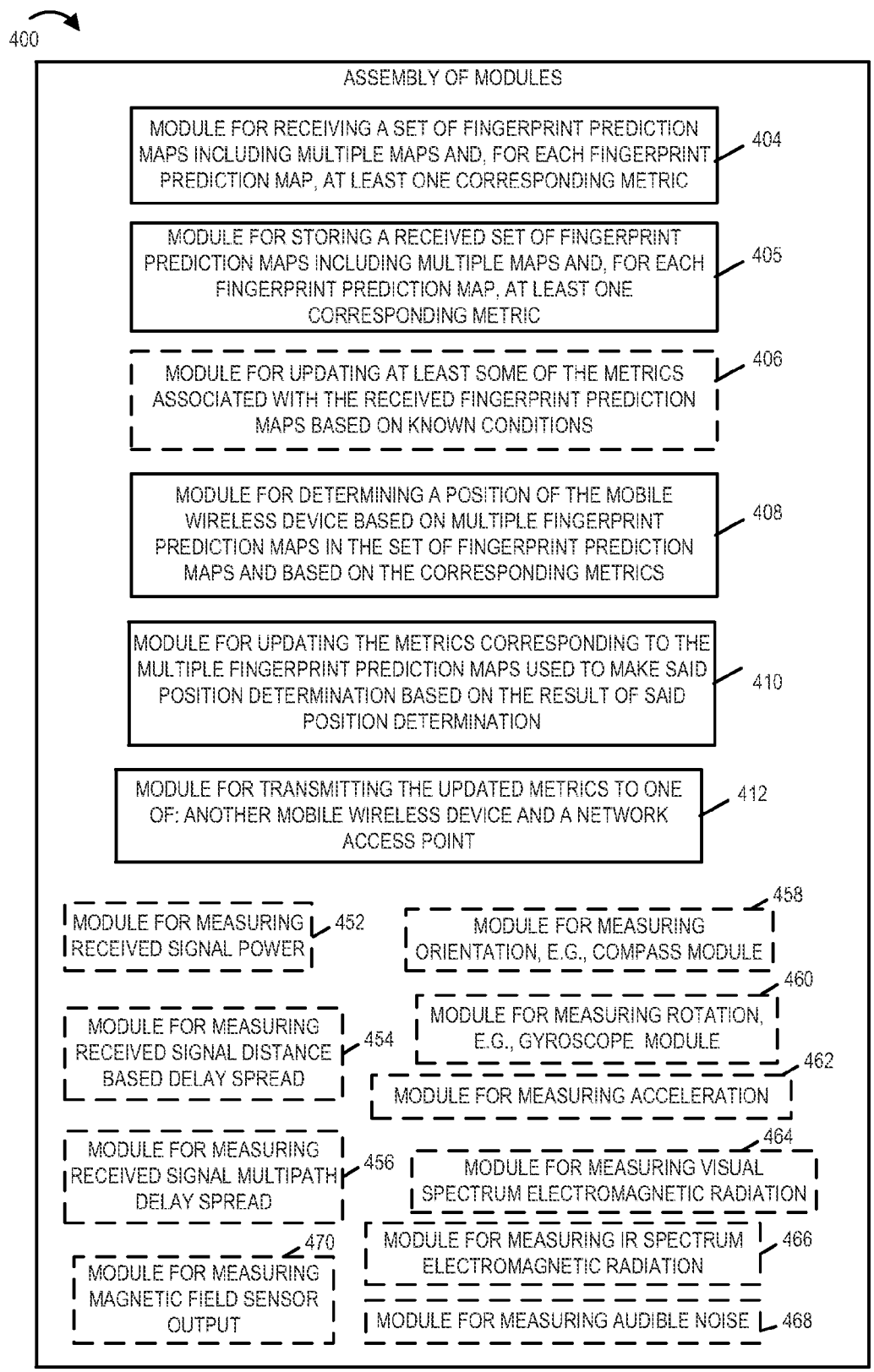
FIG. 4 is an assembly of modules which may be used in the exemplary mobile wireless device of FIG. 3.

FIG. 4 is an assembly of modules 400 which can, and in some embodiments is, used in the mobile wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the mobile wireless device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the mobile wireless device 300 or elements therein such as the processor 302, to perform the functions of the corresponding steps illustrated and/or described in the method of flowchart 200 of FIG. 2.

Assembly of modules 400 includes a module 404 for receiving a set of fingerprint prediction maps including multiple maps, and for each map, at least one corresponding metric, a module 405 for storing received a set of fingerprint prediction maps including multiple maps, and for each map, at least one corresponding metric, a module 408 for determining a position of the mobile wireless device based on multiple fingerprint prediction maps in the set of fingerprint prediction maps and based on the corresponding metrics, a module 410 for updating the metrics corresponding to the multiple fingerprint prediction maps used to make said position determination based on the result of the position determination, and a module 412 for transmitting the updated metrics to one of: another mobile wireless device and a network access point. In various embodiments, assembly of modules 400 includes a module 406 for updating at least some of the metrics associated with the received fingerprint prediction maps based on known conditions.

In various embodiments, each metric represents the probability that a fingerprint prediction map corresponding to that metric is currently valid. In some embodiments, the set of fingerprint prediction maps include fingerprint prediction maps which correspond to at least one of: structural differences in an indoor environment, differences in mobile device density, weather conditions, whether electrically powered equipment is on or off, and different times of day.

In some embodiments, the determination of module 408 is a probabilistic determination. In some embodiments module 408 for determining a position of the mobile wireless device further bases its position determination on sensor readings. In various embodiments, the sensor readings include RF measurement readings, e.g., power measurement readings, delay spread measurement reading, etc., corresponding to multiple frequencies. In some embodiments, the RF measurements include at least one of: multipath delay spread and power of a received signal. In various embodiments, the sensor readings include at least one of a compass output, a magnetic sensor output, an accelerometer output and a gyroscope output.

In some embodiments, assembly of modules 400 includes one or more of all of: a module 452 for measuring received signal power, a module 454 for measuring received signal distance based delay spread, a module 456 for measuring received signal multi-path delay spread, a module 458 for measuring orientation, e.g., a compass module, a module 460 for measuring rotation, e.g., a gyroscope module, a module 462 for measuring acceleration, e.g., an accelerometer triad module, a module 464 for measuring visual spectrum electromagnetic radiation, e.g., a visible light camera module, a module 466 for measuring IR spectrum electromagnetic radiation, e.g., an IR camera module, a module 468 for measuring audible noise, and a module 470 for measuring magnetic field sensor output.

FIG. 5-9 illustrate an example in which a mobile wireless device implements an exemplary method in accordance with an exemplary embodiment. The exemplary mobile wireless device is, e.g., mobile wireless device 300 of FIG. 3 implementing a method in accordance with flowchart 200 of FIG. 2.

Figure 5:
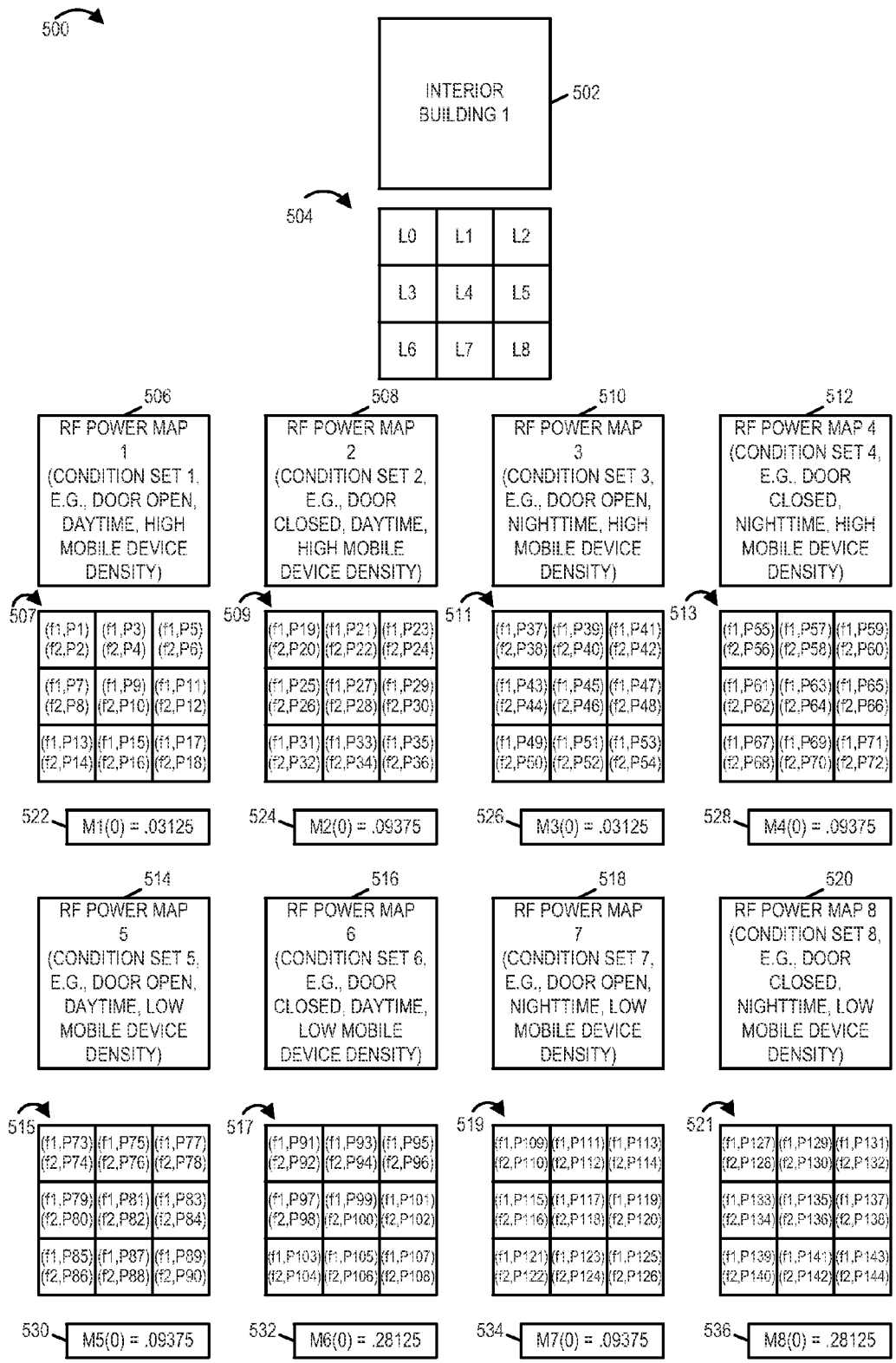
FIG. 5 includes a drawing which illustrates an exemplary set of fingerprint prediction maps and for each fingerprint prediction map a corresponding probability metric.

FIG. 5 includes drawing 500 which illustrates an exemplary set of fingerprint prediction maps (506, 508, 510, 512, 514, 516, 518, 520) and for each fingerprint prediction map a corresponding probability metric (522, 524, 526, 528, 530, 532, 534, 536), respectively. The exemplary fingerprint prediction maps (506, 508, 510, 512, 514, 516, 518, 520) and corresponding metrics (522, 524, 526, 528, 530, 532, 534, 536) are received by the mobile wireless device. The exemplary fingerprint prediction maps (506, 508, 510, 512, 514, 516, 518, 520) and corresponding metrics (522, 524, 526, 528, 530, 532, 534, 536) correspond to the interior of building 1 502. The interior of building 1 502 can be further represented by grid locations (L0, L1, L2, L3, L4, L5, L6, L7, L8) as indicated by block 504. Each fingerprint prediction map is an RF power map which corresponds to interior building 1 502 and which corresponds to a set of conditions.

RF power map 1 506 corresponds to condition set 1, e.g., door open, daytime, and high mobile device density. RF power map 1 506 is represented by sets of expected received power levels corresponding to different frequencies at different grid locations as indicated by block 507. Corresponding to grid location L0, the expected received power for frequency f1 is P1 and the expected received power for frequency f2 is P2. Corresponding to grid location L1, the expected received power for frequency f1 is P3 and the expected received power for frequency f2 is P4. Corresponding to grid location L2, the expected received power for frequency f1 is P5 and the expected received power for frequency f2 is P6. Corresponding to grid location L3, the expected received power for frequency f1 is P7 and the expected received power for frequency f2 is P8. Corresponding to grid location L4, the expected received power for frequency f1 is P9 and the expected received power for frequency f2 is P10. Corresponding to grid location L5, the expected received power for frequency f1 is P11 and the expected received power for frequency f2 is P12. Corresponding to grid location L6, the expected received power for frequency f1 is P13 and the expected received power for frequency f2 is P14. Corresponding to grid location L7, the expected received power for frequency f1 is P15 and the expected received power for frequency f2 is P16. Corresponding to grid location L8, the expected received power for frequency f1 is P17 and the expected received power for frequency f2 is P18.

RF power map 2 508 corresponds to condition set 2, e.g., door closed, daytime, and high mobile device density. RF power map 2 508 is represented by sets of expected received power levels corresponding to different frequencies at different grid locations as indicated by block 509. Corresponding to grid location L0, the expected received power for frequency f1 is P19 and the expected received power for frequency f2 is P20. Corresponding to grid location L1, the expected received power for frequency f1 is P21 and the expected received power for frequency f2 is P22. Corresponding to grid location L2, the expected received power for frequency f1 is P23 and the expected received power for frequency f2 is P24. Corresponding to grid location L3, the expected received power for frequency f1 is P25 and the expected received power for frequency f2 is P26. Corresponding to grid location L4, the expected received power for frequency f1 is P27 and the expected received power for frequency f2 is P28. Corresponding to grid location L5, the expected received power for frequency f1 is P29 and the expected received power for frequency f2 is P30. Corresponding to grid location L6, the expected received power for frequency f1 is P31 and the expected received power for frequency f2 is P32. Corresponding to grid location L7, the expected received power for frequency f1 is P33 and the expected received power for frequency f2 is P34. Corresponding to grid location L8, the expected received power for frequency f1 is P35 and the expected received power for frequency f2 is P36.

RF power map 3 510 corresponds to condition set 3, e.g., door open, nighttime, and high mobile device density. RF power map 3 510 is represented by sets of expected received power levels corresponding to different frequencies at different grid locations as indicated by block 511. Corresponding to grid location L0, the expected received power for frequency f1 is P37 and the expected received power for frequency f2 is P38. Corresponding to grid location L1, the expected received power for frequency f1 is P39 and the expected received power for frequency f2 is P40. Corresponding to grid location L2, the expected received power for frequency f1 is P41 and the expected received power for frequency f2 is P42. Corresponding to grid location L3, the expected received power for frequency f1 is P43 and the expected received power for frequency f2 is P44. Corresponding to grid location L4, the expected received power for frequency f1 is P45 and the expected received power for frequency f2 is P46. Corresponding to grid location L5, the expected received power for frequency f1 is P47 and the expected received power for frequency f2 is P48. Corresponding to grid location L6, the expected received power for frequency f1 is P49 and the expected received power for frequency f2 is P50. Corresponding to grid location L7, the expected received power for frequency f1 is P51 and the expected received power for frequency f2 is P52. Corresponding to grid location L8, the expected received power for frequency f1 is P53 and the expected received power for frequency f2 is P54.

RF power map 4 512 corresponds to condition set 4, e.g., door closed, nighttime, and high mobile device density. RF power map 4 512 is represented by sets of expected received power levels corresponding to different frequencies at different grid locations as indicated by block 513. Corresponding to grid location L0, the expected received power for frequency f1 is P55 and the expected received power for frequency f2 is P56. Corresponding to grid location L1, the expected received power for frequency f1 is P57 and the expected received power for frequency f2 is P58. Corresponding to grid location L2, the expected received power for frequency f1 is P59 and the expected received power for frequency f2 is P60. Corresponding to grid location L3, the expected received power for frequency f1 is P61 and the expected received power for frequency f2 is P62. Corresponding to grid location L4, the expected received power for frequency f1 is P63 and the expected received power for frequency f2 is P64. Corresponding to grid location L5, the expected received power for frequency f1 is P65 and the expected received power for frequency f2 is P66. Corresponding to grid location L6, the expected received power for frequency f1 is P67 and the expected received power for frequency f2 is P68. Corresponding to grid location L7, the expected received power for frequency f1 is P69 and the expected received power for frequency f2 is P70. Corresponding to grid location L8, the expected received power for frequency f1 is P71 and the expected received power for frequency f2 is P72.

RF power map 5 514 corresponds to condition set 5, e.g., door open, daytime, and low mobile device density. RF power map 5 514 is represented by sets of expected received power levels corresponding to different frequencies at different grid locations as indicated by block 515. Corresponding to grid location L0, the expected received power for frequency f1 is P73 and the expected received power for frequency f2 is P74. Corresponding to grid location L1, the expected received power for frequency f1 is P75 and the expected received power for frequency f2 is P76. Corresponding to grid location L2, the expected received power for frequency f1 is P77 and the expected received power for frequency f2 is P78. Corresponding to grid location L3, the expected received power for frequency f1 is P79 and the expected received power for frequency f2 is P80. Corresponding to grid location L4, the expected received power for frequency f1 is P81 and the expected received power for frequency f2 is P82. Corresponding to grid location L5, the expected received power for frequency f1 is P83 and the expected received power for frequency f2 is P84. Corresponding to grid location L6, the expected received power for frequency f1 is P85 and the expected received power for frequency f2 is P86. Corresponding to grid location L7, the expected received power for frequency f1 is P87 and the expected received power for frequency f2 is P88. Corresponding to grid location L8, the expected received power for frequency f1 is P89 and the expected received power for frequency f2 is P90.

RF power map 6 516 corresponds to condition set 6, e.g., door closed, daytime, and low mobile device density. RF power map 6 516 is represented by sets of expected received power levels corresponding to different frequencies at different grid locations as indicated by block 517. Corresponding to grid location L0, the expected received power for frequency f1 is P91 and the expected received power for frequency f2 is P92. Corresponding to grid location L1, the expected received power for frequency f1 is P93 and the expected received power for frequency f2 is P94. Corresponding to grid location L2, the expected received power for frequency f1 is P95 and the expected received power for frequency f2 is P96. Corresponding to grid location L3, the expected received power for frequency f1 is P97 and the expected received power for frequency f2 is P98. Corresponding to grid location L4, the expected received power for frequency f1 is P99 and the expected received power for frequency f2 is P100. Corresponding to grid location L5, the expected received power for frequency f1 is P101 and the expected received power for frequency f2 is P102. Corresponding to grid location L6, the expected received power for frequency f1 is P103 and the expected received power for frequency f2 is P104. Corresponding to grid location L7, the expected received power for frequency f1 is P105 and the expected received power for frequency f2 is P106. Corresponding to grid location L8, the expected received power for frequency f1 is P107 and the expected received power for frequency f2 is P108.

RF power map 7 518 corresponds to condition set 7, e.g., door open, nighttime, and low mobile device density. RF power map 7 518 is represented by sets of expected received power levels corresponding to different frequencies at different grid locations as indicated by block 519. Corresponding to grid location L0, the expected received power for frequency f1 is P109 and the expected received power for frequency f2 is P110. Corresponding to grid location L1, the expected received power for frequency f1 is P111 and the expected received power for frequency f2 is P112. Corresponding to grid location L2, the expected received power for frequency f1 is P113 and the expected received power for frequency f2 is P114. Corresponding to grid location L3, the expected received power for frequency f1 is P115 and the expected received power for frequency f2 is P116. Corresponding to grid location L4, the expected received power for frequency f1 is P117 and the expected received power for frequency f2 is P118. Corresponding to grid location L5, the expected received power for frequency f1 is P119 and the expected received power for frequency f2 is P120. Corresponding to grid location L6, the expected received power for frequency f1 is P121 and the expected received power for frequency f2 is P122. Corresponding to grid location L7, the expected received power for frequency f1 is P123 and the expected received power for frequency f2 is P124. Corresponding to grid location L8, the expected received power for frequency f1 is P125 and the expected received power for frequency f2 is P126.

RF power map 8 520 corresponds to condition set 8, e.g., door closed, nighttime, and low mobile device density. RF power map 8 520 is represented by sets of expected received power levels corresponding to different frequencies at different grid locations as indicated by block 521. Corresponding to grid location L0, the expected received power for frequency f1 is P127 and the expected received power for frequency f2 is P128. Corresponding to grid location L1, the expected received power for frequency f1 is P129 and the expected received power for frequency f2 is P130. Corresponding to grid location L2, the expected received power for frequency f1 is P131 and the expected received power for frequency f2 is P132. Corresponding to grid location L3, the expected received power for frequency f1 is P133 and the expected received power for frequency f2 is P134. Corresponding to grid location L4, the expected received power for frequency f1 is P135 and the expected received power for frequency f2 is P136. Corresponding to grid location L5, the expected received power for frequency f1 is P137 and the expected received power for frequency f2 is P138. Corresponding to grid location L6, the expected received power for frequency f1 is P139 and the expected received power for frequency f2 is P140. Corresponding to grid location L7, the expected received power for frequency f1 is P141 and the expected received power for frequency f2 is P142. Corresponding to grid location L8, the expected received power for frequency f1 is P143 and the expected received power for frequency f2 is P144.

In this example metrics (M1, M2, M3, M4, M5, M6, M7, M8) correspond to RF power maps (map 1, map 2, map 3, map 4, map 5, map 6, map 8), respectively. Each metric represents a probability, e.g., the probability that the fingerprint prediction map corresponding to the metric is currently valid. In this example M1(0)=0.03125, M2(0)=0.09375, M3(0)=0.03125, M4(0)=0.09375, M5(0)=0.09375, M6(0)=0.28125, M7(0)=0.09375 and M8(0)=0.28125. It may be observed that the summation of {M1(0), M2(0), M3(0), M4(0), M5(0), M6(0), M7(0), M8(0)} equals 1.

Figure 6:
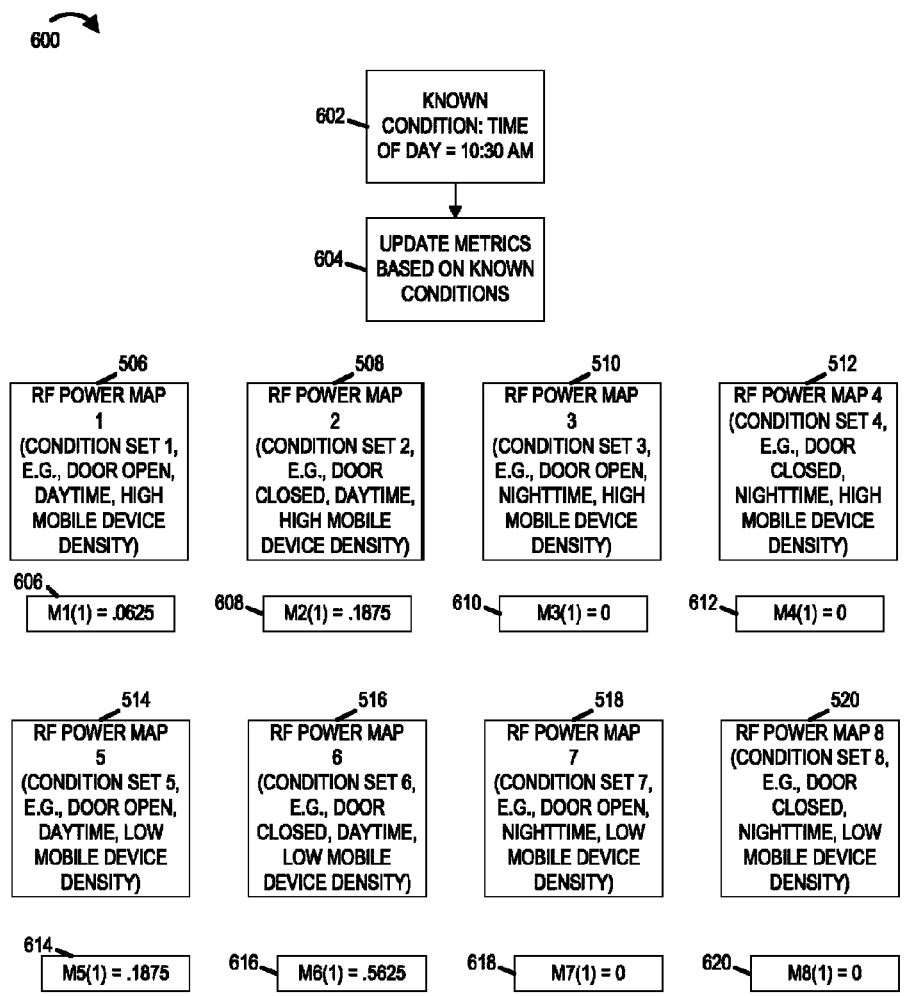
FIG. 6 illustrates exemplary updating of metrics corresponding to fingerprint prediction maps based upon known conditions.

Drawing 600 of FIG. 6 illustrates exemplary updating of metrics based upon known conditions. Consider that the mobile wireless device knows that the current time of day is 10:30 AM as indicated by block 602. The mobile wireless devices updates the metrics (M1, M2, M3, M4, M5, M6, M7, M8) based on the know conditions as indicated by block 604. In this example, the mobile wireless device sets the metrics corresponding to power maps at nighttime to 0 and sets the metrics corresponding to daytime maps to higher values. Corresponding to map 1 506 metric M1 is updated to obtain M1(1)=0.0625 as indicated by block 606. Corresponding to map 2 508 metric M2 is updated to obtain M2(1)=0.1875 as indicated by block 608. Corresponding to map 3 510 metric M3 is updated to obtain M3(1)=0 as indicated by block 610. Corresponding to map 4 512 metric M4 is updated to obtain M4(1)=0 as indicated by block 612. Corresponding to map 5 514 metric M5 is updated to obtain M5(1)=0.1875 as indicated by block 614. Corresponding to map 6 516 metric M6 is updated to obtain M6(1)=0.5625 as indicated by block 616. Corresponding to map 7 518 metric M7 is updated to obtain M7(1)=0 as indicated by block 618. Corresponding to map 8 520 metric M8 is updated to obtain M8(1)=0 as indicated by block 620. It may be observed that the summation of {M1(1), M2(1), M3(1), M4(1), M5(1), M6(1), M7(1), M8(1)} equals 1.

Figure 7:
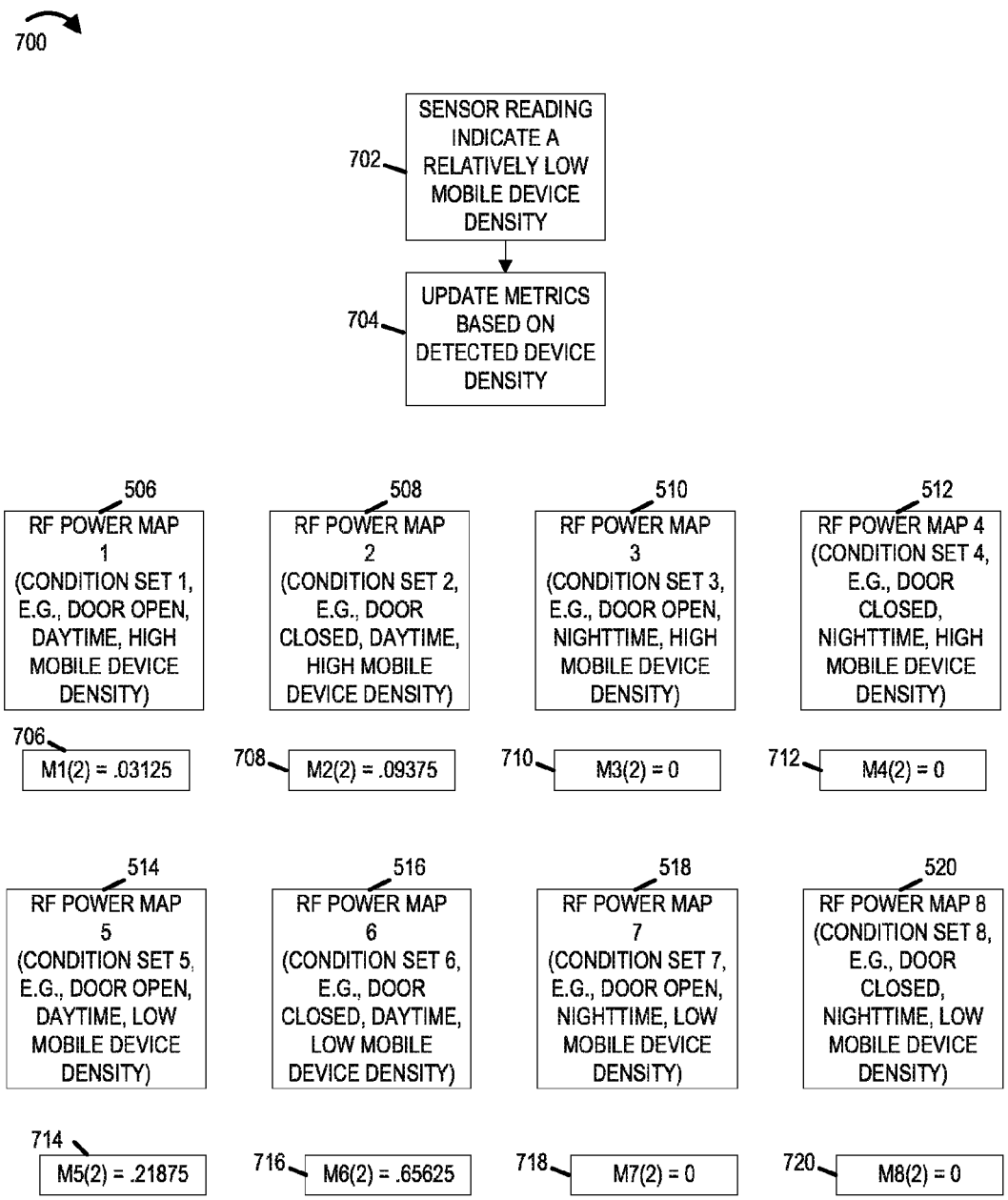
FIG. 7 illustrates exemplary updating of metrics corresponding to fingerprint prediction maps based upon sensor readings.

Drawing 700 of FIG. 7 illustrates exemplary updating of metrics based upon sensor readings. Consider that the mobile wireless device sensor readings which are being monitored indicate that there is currently a relatively low mobile device density in its region, as indicated by block 702. For example, the mobile wireless device, in some embodiments, monitors for peer to peer discovery signals from other devices, counts the number of detected devices, and compares the detected device count to a predetermined threshold to determine whether the mobile device considers itself to be in a low mobile density environment or high mobile device density environment. In this example, consider that the mobile wireless device has determined that its sensor readings indicate a relatively low mobile device density environment. The mobile wireless device updates the metrics M1, M2, M3, M4, M5, M6, M7 and M8 based on the detected device density.

In this example, the metrics corresponding to the daytime power maps are updated as a function of the determined device density, e.g., the daytime low device density maps' metrics are increased and the daytime high density maps' metrics are decreased. Corresponding to map 1 506 metric M1 is updated to obtain M1(2)=0.03125 as indicated by block 706. Corresponding to map 2 508 metric M2 is updated to obtain M2(2)=0.09375 as indicated by block 708. Corresponding to map 3 510 metric M3 is updated to obtain M3(2)=0 as indicated by block 710. Corresponding to map 4 512 metric M4 is updated to obtain M4(2)=0 as indicated by block 712. Corresponding to map 5 514 metric M5 is updated to obtain M5(2)=0.21875 as indicated by block 714. Corresponding to map 6 516 metric M6 is updated to obtain M6(2)=0.65625 as indicated by block 716. Corresponding to map 7 518 metric M7 is updated to obtain M7(2)=0 as indicated by block 718. Corresponding to map 8 520 metric M8 is updated to obtain M8(2)=0 as indicated by block 720. It may be observed that the summation of {M1(2), M2(2), M3(2), M4(2), M5(2), M6(2), M7(2), M8(2)} equals 1.

Figure 8:
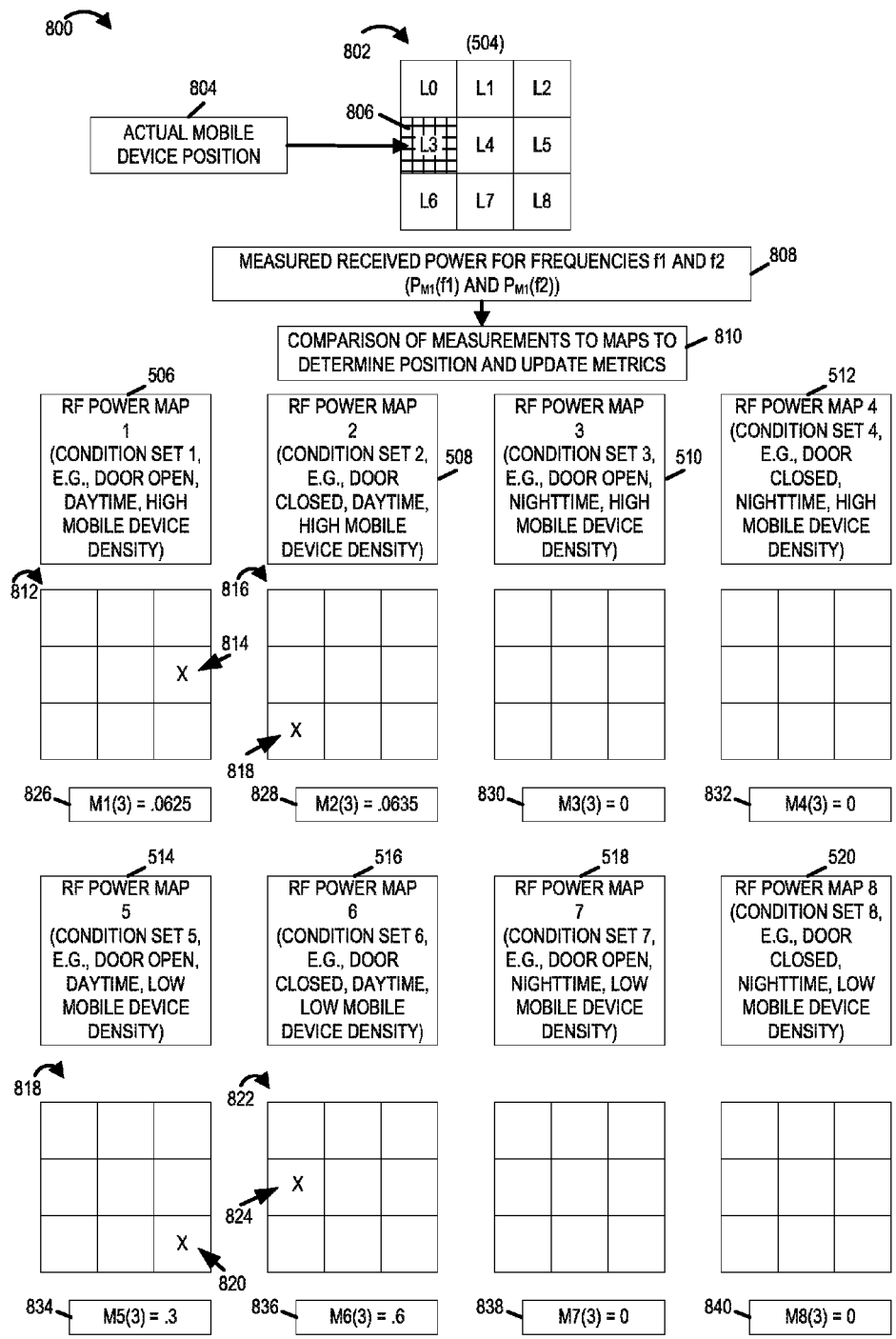
FIG. 8 illustrates an exemplary location of the mobile wireless device, exemplary measurements of received power corresponding to different frequencies, comparison of the received power to the fingerprint prediction maps, position determination and updating of metrics.

FIG. 8 illustrates an exemplary location of the mobile wireless device, exemplary measurements of received power corresponding to different frequencies, comparison of the received power to the fingerprint prediction maps, position determination and updating of metrics.

Consider that the actual mobile wireless device's position 804 is within grid location L3 806 on grid 504 of drawing 802. The mobile wireless device measures the received power corresponding to frequencies f1 and f2 obtaining $P_{M1}(f1)$ and $P_{M1}(f2)$, respectively as indicated by block 808. The mobile wireless device compares the received power measurements $P_{M1}(f1)$ and $P_{M1}(f2)$ to stored RF power map information to determine position; and the mobile wireless device also updates the metrics, as indicated by block 810.

With regard to RF power map 1 506, consider that the mobile wireless device finds the closest match between expected measurements and received measurements is grid location L5 814 as indicated on drawing 812. With regard to RF power map 2 508, consider that the mobile wireless device finds the closest match between expected measurements and received measurements is grid location L6 818 as indicated on drawing 816. With regard to RF power map 5 514, consider that the mobile wireless device finds the closest match between expected measurements and received measurements is grid location L8 820 as indicated on drawing 818. With regard to RF power map 6 516, consider that the mobile wireless device finds the closest match between expected measurements and received measurements is grid location L3 824 as indicated on drawing 822.

The mobile wireless device also updates the metrics, e.g., as a function of correlation between the detected measurements and the expected measurements on the determined grid position. Corresponding to map 1 506 metric M1 is updated to obtain M1(3)=0.0625 as indicated by block 826. Corresponding to map 2 508 metric M2 is updated to obtain M2(3)=0.0635 as indicated by block 828. Corresponding to map 3 510 metric M3 is updated to obtain M3(3)=0 as indicated by block 830. Corresponding to map 4 512 metric M4 is updated to obtain M4(3)=0 as indicated by block 832. Corresponding to map 5 514 metric M5 is updated to obtain M5(3)=0.3 as indicated by block 834. Corresponding to map 6 516 metric M6 is updated to obtain M6(3)=0.6 as indicated by block 836. Corresponding to map 7 518 metric M7 is updated to obtain M7(3)=0 as indicated by block 838. Corresponding to map 8 520 metric M8 is updated to obtain M8(3)=0 as indicated by block 840. It may be observed that the summation of {M1(3), M2(3), M3(3), M4(3), M5(3), M6(3), M7(3), M8(3)} equals 1.

Figure 9:
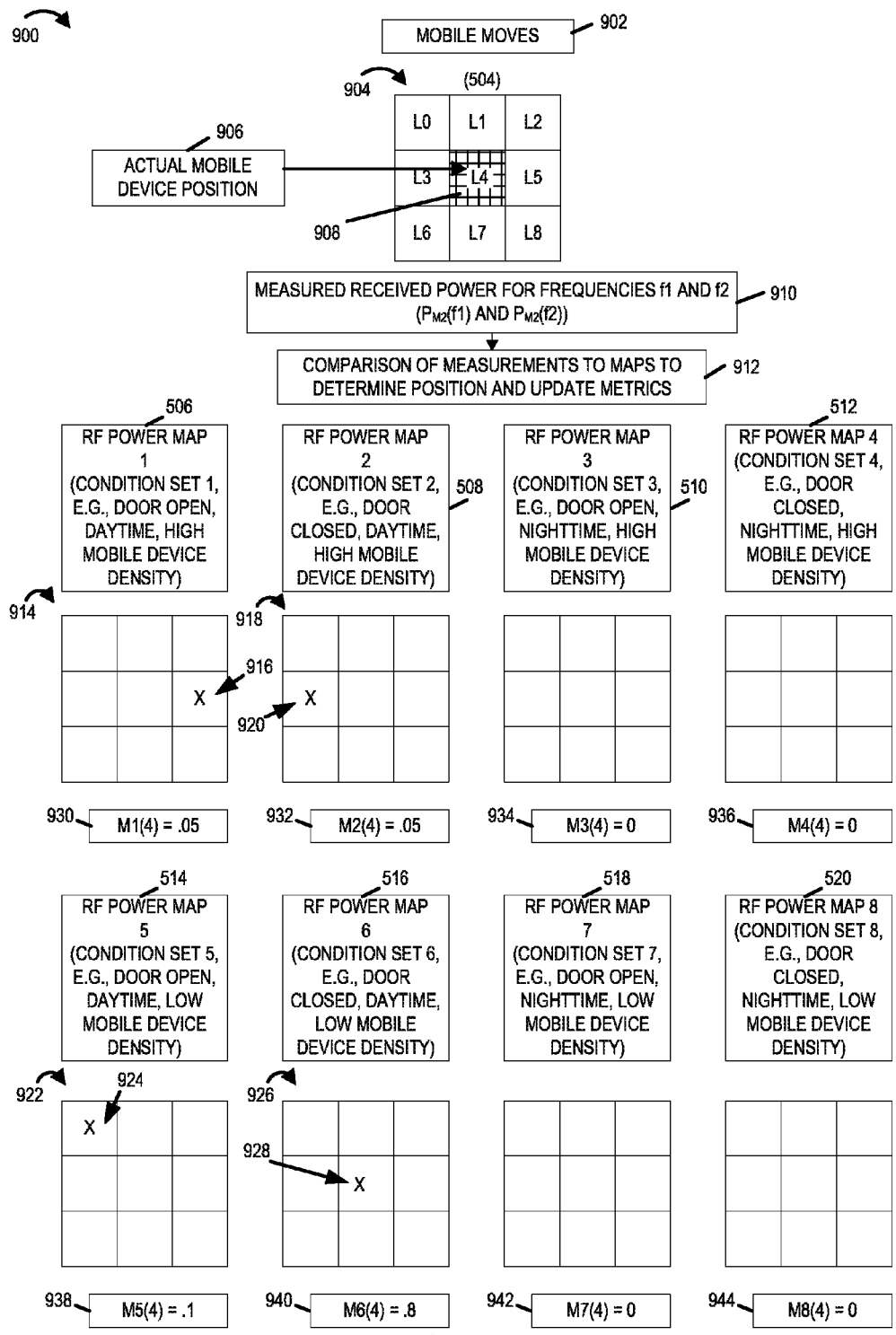
FIG. 9 illustrates an exemplary location of the mobile wireless device, exemplary measurements of received power corresponding to different frequencies, comparison of the received power to the fingerprint prediction maps, position determination and updating of metrics.

Drawing 900 of FIG. 9 illustrates an exemplary location of the mobile wireless device, exemplary measurements of received power corresponding to different frequencies, comparison of the received power to the fingerprint prediction maps, position determination and updating of metrics.

Consider that the mobile device has moved as indicated by block 902, and the actual current mobile wireless device's position 906 is within grid location L4 908 on grid 504 of drawing 904. The mobile wireless device measures the received power corresponding to frequencies f1 and f2 obtaining $P_{M2}(f1)$ and $P_{M2}(f2)$, respectively as indicated by block 910. The mobile wireless device compares the received power measurements $P_{M2}(f1)$ and $P_{M2}(f2)$ to stored RF power map information to determine position; and the mobile wireless device also updates the metrics, as indicated by block 912.

With regard to RF power map 1 506, consider that the mobile wireless device finds the closest match between expected measurements and received measurements is grid location L5 916 as indicated on drawing 914. With regard to RF power map 2 508, consider that the mobile wireless device finds the closest match between expected measurements and received measurements is grid location L3 920 as indicated on drawing 918. With regard to RF power map 5 514, consider that the mobile wireless device finds the closest match between expected measurements and received measurements is grid location L0 924 as indicated on drawing 922. With regard to RF power map 6 516, consider that the mobile wireless device finds the closest match between expected measurements and received measurements is grid location L4 928 as indicated on drawing 926.

The mobile wireless terminal also updates the metrics, e.g., as a function of correlation between the detected measurements and the expected measurements on the determined grid position and the determined position. In this example, with regard to map M5, consider that the mobile wireless device considers that it is unlikely that the mobile wireless device is able to move from grid location L8 820 of FIG. 8 to grid location L0 924 of FIG. 9 in the time between the measurements corresponding to FIG. 8 and the measurements corresponding to FIG. 9; thus metric M5 is decreased. Also in this example, with regard to map M6, consider that the mobile wireless device considers that it is likely that the mobile wireless device is able to move from grid location L3 824 of FIG. 8 to grid location L4 928 of FIG. 9 in the time between the measurements corresponding to FIG. 8 and the measurements corresponding to FIG. 9; thus metric M6 is increased. Corresponding to map 1 506 metric M1 is updated to obtain M1(4)=0.05 as indicated by block 930. Corresponding to map 2 508 metric M2 is updated to obtain M2(4)=0.05 as indicated by block 932. Corresponding to map 3 510 metric M3 is updated to obtain M3(4)=0 as indicated by block 934. Corresponding to map 4 512 metric M4 is updated to obtain M4(4)=0 as indicated by block 936. Corresponding to map 5 514 metric M5 is updated to obtain M5(4)=0.1 as indicated by block 938. Corresponding to map 6 516 metric M6 is updated to obtain M6(4)=0.8 as indicated by block 940. Corresponding to map 7 518 metric M7 is updated to obtain M7(4)=0 as indicated by block 942. Corresponding to map 8 520 metric M8 is updated to obtain M8(4)=0 as indicated by block 944. It may be observed that the summation of {M1(4), M2(4), M3(4), M4(4), M5(4), M6(4), M7(4), M8(4)} equals 1.

In this example, the mobile wireless device has determined the current position of the wireless device to be grid location L4 with a corresponding probability metric value M6(4)=0.8. In various embodiments, the mobile wireless device transmits updated metrics, e.g., metrics (M1(4), M2(4), M3(4), M4(4), M5(4), M6(4), M7(4), M8(4)), to one of: another mobile device and a network access point. In various embodiments, the updated metrics are communicated to a network node, e.g., a mobile wireless device tracking node. In some embodiments, the network node is the same node which originally sourced the set of fingerprint prediction maps and corresponding metrics of FIG. 5. In some embodiments, the network node, e.g., the mobile wireless device tracking node, receives updated metrics from multiple mobile wireless devices, and updates stored metrics corresponding to the fingerprint prediction maps as a function of the received information.

In various embodiments, the mobile wireless device's refined position determination of grid location L4 is communicated to a network node, e.g., is communicated to a mobile wireless device tracking node via an access point. The network node, e.g., mobile wireless device tracking node, stores and maintains position information corresponding to a plurality of wireless devices. In some embodiments, the mobile wireless device transmits, e.g., broadcasts, its determined refined position determination to be available to other mobile devices in its current vicinity. In some such embodiments, the broadcasted refined mobile device position information is communicated in a peer discovery signal or signals, e.g., as part of a peer to peer signaling protocol. In some such embodiments, the broadcasted refined position information is communicated along with probability information. In some embodiments, the broadcasted refined position information is communicated, e.g., in a peer discovery signal or signals, along with an indication that the position determination is based on a fingerprint predication map. In some embodiments, there is a communicated indicator bit along with the position determination information identifying whether the broadcast position information is a coarse position estimation or refined position estimation. In some embodiments, there is a communicated indicator bit along with the position determination information identifying whether the broadcast position information is based on location anchor points or based on a fingerprint predication map set. In some embodiments, there is a range value communicated along with the broadcast position determination, e.g., identifying the amount of area associated with the position determination.

Figure 10:
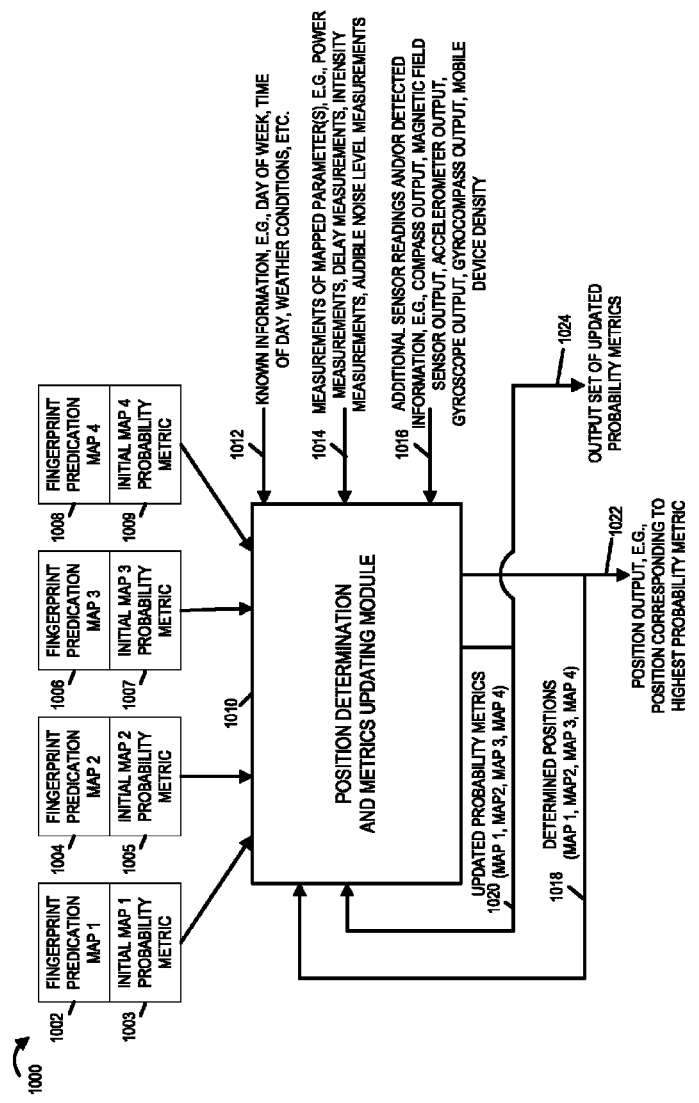
FIG. 10 is a drawing used to illustrate an exemplary method of operating a operating a mobile wireless device in accordance with an exemplary embodiment.

FIG. 10 is a drawing 1000 used to illustrate an exemplary method of operating a mobile wireless device in accordance with an exemplary embodiment. The method is, e.g., in accordance with flowchart 200 of FIG. 2 and/or performed by exemplary mobile wireless device 300 of FIG. 3. The exemplary method improves the reliability of a position estimate of the mobile wireless device. The mobile wireless device may have a coarse estimation of its position. Consider that the mobile wireless device communicates its coarse position estimation to a network element, e.g., a mobile device location tracking server node via an access point. Further consider that the network element communicates a set of fingerprint prediction maps and corresponding metrics, which correspond to a location including the coarse position estimate, e.g., a particular building, to the mobile wireless device. The mobile wireless device receives the set of fingerprint prediction maps including multiple maps and, for each fingerprint prediction map at least one corresponding metric. In this example, the set of fingerprint prediction maps is the set of {fingerprint prediction map 1 1002, fingerprint prediction map 2 1004, fingerprint prediction map 3 1006, fingerprint prediction map 4 1008} and the corresponding metrics are {initial map 1 probability metric 1003, initial map 2 probability metric 1005, initial map 3 probability metric 1007, initial map 4 probability metric 1009}, respectively. Each of the fingerprint prediction maps corresponding to a different set of conditions. The summation of the initial probability metrics values (initial map 1 probability metric 1003, initial map 2 probability metric 1005, initial map 3 probability metric 1007, initial map 4 probability metric 1009) equals 1.

The fingerprint predictions maps (1002, 1004, 1006, 1008) and corresponding probability metrics (1003, 1005, 1007, 1009), respectively, are inputs to the position determination and metrics updating module 1010 of the mobile wireless device. Other inputs to the position determination and metrics updating module include: known information 1012, e.g., the day of the week, the time of the day, known weather conditions, etc., measurements of mapped parameter(s) 1014, e.g., power measurements, delay measurements, intensity measurements, audible noise level measurements, etc., and additional sensor readings and/or detected information 1016, e.g., a compass output, a magnetic field sensor output, an accelerometer output, a gyroscope output, a gyrocompass output, and a mobile device density measurement, estimation or determination.

The position determination and metrics updating module 1010 uses the inputs (1002, 1004, 1006, 1008, 1003, 1005, 1007, 1009, 1012, 1014 and 1016) to determine mobile wireless device position and update the probability metrics. The mobile wireless device position determination and updating module 1010 determines the mobile wireless device's estimated position corresponding to each of the four maps (map 1, map 2, map 3 and map 4), resulting in four position determinations 1018. Module 1010 also determines updated probability metrics corresponding to each of the four maps (map 1, map 2, map 3, map 4) 1020. The summation of the four updated probability metrics equals 1.

The determined positions 1018 and the corresponding updated probability metrics 1020 are fed back as input to the position determination and metrics updating module 1010. The position determination and metrics updating module 1010 uses the fingerprint prediction maps (1002, 1004, 1006, 1008), known information 1012, measurements of mapped parameter(s) 1014, additional sensor readings and/or detected information 1016, determined positions 1018, and updated probability metrics 1020 to determine mobile wireless device position and update the probability metrics.

This process may be, and sometimes is, repeated for multiple iterations. At some point, the mobile wireless device outputs position information 1022, e.g., the determined position corresponding to highest probability metric. For example, consider that the updated probability metrics are: updated map 1 probability metric=0.05, updated map 2 probability metric=0.15, updated map 3 probability metric=0.7 and updated map 4 probability metric=0.1, then position output 1022 is the determined position corresponding to map 3, which is the mobile wireless device's best estimation of its current position. In some embodiments, the determined position 1022 is transmitted to a network node, e.g., a location tracking server node, via an access point. In some embodiments, the determined position 1022 is broadcast, e.g., to be available to be received and detected by other mobile wireless devices which may be in its vicinity.

In some embodiments, an output set of updated metrics 1024 is transmitted to one of another mobile device and a network access point. In various embodiments, the updated metrics 1024 is communicated from the mobile wireless device to a network node, e.g., a mobile device location tracking server node, via an access point. The location tracking server node can, and sometimes does, use the received set of updated probability metrics to update the set of initial map probability metrics. The location tracking server node can,
and sometimes does, receive and use received set of updated probability metrics from multiple mobile wireless devices to update the set of initial map probability metrics.

Figure 11:
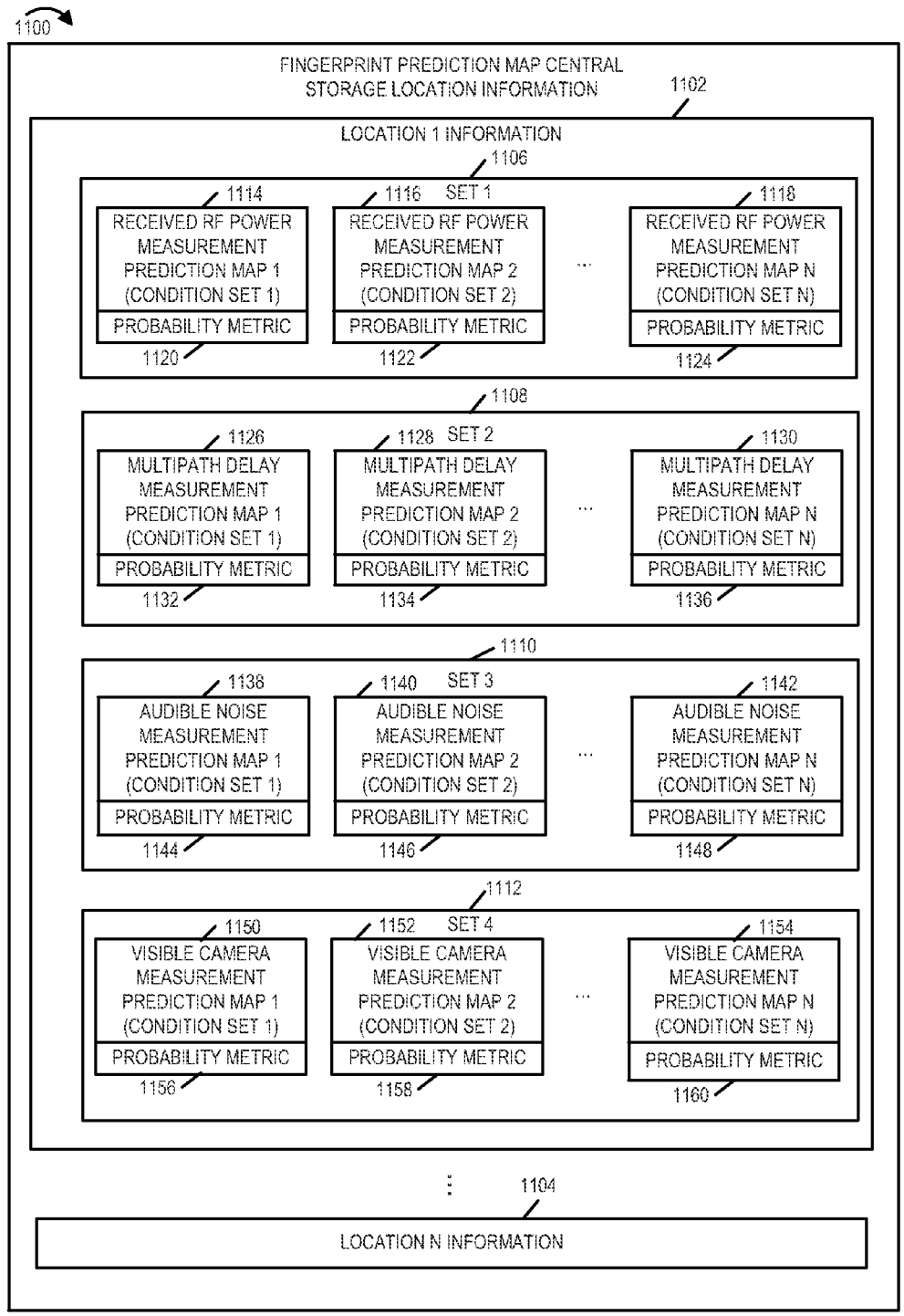
FIG. 11 is a drawing of fingerprint prediction map central storage location information including multiple sets of fingerprint predication maps corresponding to different measurement parameters.

FIG. 11 is a drawing of fingerprint prediction map central storage location information 1100. Information 1100 is, e.g., stored in a mobile device location tracking server node, and available for communication to mobile wireless devices.

Fingerprint prediction map central storage location information 1100 includes information corresponding to a plurality of locations (location 1 information 1102, ..., location N information 1104). Location 1 information 1102 includes a plurality of different sets of information (set 1 information 1106, set 2 information 1108, set 3 information 1110, set 4 information 1112).

Set 1 information 1106 includes a set of received RF power measurement fingerprint prediction maps corresponding to different sets of conditions (received RF power measurement prediction map 1 1114 for condition set 1, received RF power measurement prediction map 2 1116 for condition set 2, ..., received RF power measurement prediction map N 1118 for condition set N) and a corresponding metric for each map (probability metric 1120, probability metric 1122, ..., probability metric 1124), respectively. The summation of probability metrics (1120, 1122, ..., 1124) equals 1.

Set 2 information 1108 includes a set of multipath delay measurement fingerprint prediction maps corresponding to different sets of conditions (received multipath delay prediction map 1 1126 for condition set 1, received multipath delay measurement prediction map 2 1128 for condition set 2, ..., received multipath delay measurement prediction map N 1130 for condition set N) and a corresponding metric for each map (probability metric 1132, probability metric 1134, ..., probability metric 1136), respectively. The summation of probability metrics (1132, 1134, ..., 1136) equals 1.

Set 3 information 1110 includes a set of audible noise measurement fingerprint prediction maps corresponding to different sets of conditions (audible noise measurement prediction map 1 1138 for condition set 1, audible nose measurement prediction map 2 1140 for condition set 2, ..., audible noise measurement prediction map N 1142 for condition set N) and a corresponding metric for each map (probability metric 1144, probability metric 1146, ..., probability metric 1148), respectively. The summation of probability metrics (1144, 1146, ..., 1148) equals 1.

Set 4 information 1112 includes a set of visible light spectrum camera measurement fingerprint prediction maps corresponding to different sets of conditions (visible camera measurement prediction map 1 1150 for condition set 1, visible camera measurement prediction map 2 1152 for condition set 2, ..., visible camera measurement prediction map N 1154 for condition set N) and a corresponding metric for each map (probability metric 1156, probability metric 1158, ..., probability metric 1160), respectively. The summation of probability metrics (1156, 1158, ..., 1160) equals 1.

Different mobile wireless devices may have different capabilities. For example, some mobile wireless devices may include a camera and be able to make use of a visible light spectrum camera fingerprint prediction map set, while other mobile wireless devices lacking a camera may not have a use for a visible light spectrum camera fingerprint prediction map set. In some embodiments, the mobile wireless device requests a type of fingerprint predictions map set and corresponding metrics that it would like to receive, e.g., based on its capabilities. In some embodiments, a mobile wireless device communicates device capability information to a network node, e.g., a location tracking server node, which selects one or more sets of fingerprint prediction map sets and corresponding metrics to communicate to the mobile wireless device as a function of the communicated device capability information.

In some embodiments, for different locations different types of fingerprint prediction map sets may be available and stored. In some embodiments, different sets of fingerprint prediction maps may have different numbers of maps. In various embodiments, a first type of fingerprint prediction map set may have different conditions sets than a second type of fingerprint predication map set, e.g., due to different factors which impact the different types of signal being measured.

Additional discussion of various elements and/or features in some, but not necessarily all, embodiments will now be described. Consider an example of an electromagnetic reference map such as the power map associated with a given Wi-Fi or another communications protocol and/or technology type access point. Various parameters have a direct or indirect impact on the actual map. For instance, consider that data measurements reveal that the measured RSSI density exhibits an average daily variation of around 2-3 dBs in a particular corporate building at a particular location. Indeed, external factors, which include, e.g., a moving crowd, a lift in motion, the variation of available electrical power, or the overall routing load, may cause fluctuations over time. Such factors are typically deterministic. Other factors may be, and sometimes are, modeled by auxiliary variables that are probabilistic in nature: this is for example the case of doors in a building whose state may be open or close or in-between.

Different mechanisms can be used to incorporate auxiliary variables into the position determination method. In some exemplary methods, a centralized or distributed server eventually chooses and/or encodes a map based on a set of parameters that it has learned or that it knows a priori. Some exemplary embodiments include a 'hard' selection of a map. Some other exemplary embodiments include a 'soft' selection of a map that may fit naturally into a probabilistic approach.

In one exemplary embodiment, consider a class of deterministic auxiliary variables. The deterministic auxiliary variables represent parameters that include, e.g., weather; time, period of the year, week, day; type of device, brand; special event; etc. In this particular embodiment, a server, which may be a centralized or distributed authority, or any peer that acts as a local nitelite provides either a map based on a set of parameters that it knows a priori or any other information based on such a set of prior knowledge. A possible implementation is as follows. Different time-unvarying maps are stored, e.g., at a server. The server may be a centralized node or distributed among a plurality of nodes. The server includes and/or has access to, e.g., a shared database which may be centralized or distributed. The server selects the actual map as a function of a set of known values and feeds it to a set of devices. Processing the map selection at the server, in some embodiments, allows for more efficient and accurate fingerprint map transmission and/or compressed map transmission.

In another embodiment, consider a class of random auxiliary variables. They represent, for example, the states of doors in a building or the current population density. In this particular embodiment, a server, which may be a centralized or distributed authority, or a peer selects either a map or information based on a set of parameters that it has directly or indirectly learned from other peers. Possible implementations are as follows:
 a) The considered parameters may be modeled as hidden random variables, which may be naturally incorporated in a Bayesian probabilistic framework. Hence, such variables can be estimated and predicted by a peer and transmitted to a server (a distributed or centralized authority). The realization of each of the hidden random variables describes the state of the system, which can be now communicated by the server to other peers. Hence, as in the previous example, the server eventually selects and distributes the actual map as a function of parameters.
 b) The value of a variable which determines the reference map may be jointly estimated by an active communication protocol over wired and/or wireless links between two anchor points/nitelites.

In the two previous examples, a server selects a map based on a set of auxiliary values that it knows a priori (autonomous variables as in the first example) or that it has learned (hidden random variables as in the second example). The map selection was hard in the previous examples, in the sense that full reliability was assigned to the server decision. More generally, soft decisions may be used. Finer implementations can and sometimes do, e.g., exploit a metric associated with auxiliary variables such as, e.g., a probability density, in order to perform a soft combining of reference maps, e.g., conditioned on priors on parameters used for map selection could as used in a probabilistic implementation. Alternative system features such as location codebook selection may also be, and sometimes are, indexed by auxiliary variables.

In some embodiments, a device first chooses a cluster of parameters or maps. The device, in some embodiments, performs a map classification based on some observations it has made. In various embodiments, after this automatic classification has been done, it allocates some particular auxiliary variables to characterize a particular cluster. The auxiliary variables may be, and sometimes are, further refined or learned. Hierarchical clustering is used in some embodiments.

In some other embodiments, a plurality of alternative maps are communicated to a mobile wireless device which determines which map to use at a particular time. In some such embodiments, the mobile wireless device selects the actual map to use at a particular time as a function of known values, known conditions and/or sensed information.

In various embodiments a mobile wireless device, e.g., mobile wireless device 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of improving the reliability of a position estimate of a mobile wireless device, comprising:
   receiving a set of fingerprint prediction maps and corresponding metrics, said fingerprint prediction maps including at least a first prediction map and a second prediction map, said metrics including a first metric corresponding to the first fingerprint prediction map indicating a probability that the first prediction map is currently valid and a second metric corresponding to the second fingerprint prediction map indicating a probability that the second prediction map is currently valid, said first and second fingerprint prediction maps corresponding to the same area but different sets of conditions;
   making, in the mobile wireless device, a sensor reading;
   updating said metrics including the first metric and the second metric based on a known current condition, said known current condition being an environmental condition;
   selecting a fingerprint prediction map in said set of fingerprint prediction maps having a highest probability of being valid as indicated by the updated metrics;
   determining, using the selected fingerprint map, a position of the mobile wireless device based on said sensor reading; and
   updating at least one of the first or second metrics based on the result of said position determination.

2. The method of claim 1, wherein said first fingerprint prediction map corresponds to a first set of conditions and said second fingerprint prediction map corresponds to a second set of conditions, said first and second sets of conditions being different.

3. The method of claim 2, wherein said first and second sets of conditions each include a door position condition, said first set of conditions indicating a door being in a different position than said second set of conditions.

4. The method of claim 3, wherein said first and second sets of conditions each further include a time of day condition, said first and second time of day conditions being different.

5. The method of claim 4, wherein said first and second sets of conditions each further include a mobile device density condition, said first set of conditions indicating a different mobile device density than said second set of conditions.

6. The method of claim 2, wherein said first and second sets of conditions each include a mobile device density condition, said first set of conditions indicating a different mobile device density than said second set of conditions.

7. The method of claim 2, wherein said first and second sets of conditions each include a time of day condition, said first set of conditions indicating a different time of day than said second set of conditions.

8. The method of claim 1, further comprising transmitting the at least one of the first or second metrics that was updated based on the result of said position determination to one of: another mobile wireless device and a network access point.

9. The method of claim 1, wherein said known current condition is one of: a time of day condition, day of week condition, weather condition, equipment on or off condition, mobile device density condition, a building condition, a door condition, or a window condition.

10. The method of claim 1, wherein said known current condition is the current time of day.

11. The method of claim 1, wherein said sensor reading includes received radio frequency (RF) signal power measurements corresponding to multiple frequencies.

12. The method of claim 1, wherein said sensor reading includes at least one of: a compass output, a magnetic field sensor output, an accelerometer output or a gyroscope output.

13. The method of claim 1, wherein said sensor reading includes at least one of multipath delay spread of a received signal or power of a received signal.

14. The method of claim 1, wherein said sensor reading is a radio frequency signal spread.

15. The method of claim 1, wherein said sensor reading is one of an accelerometer output or a gyroscope output.

16. The method of claim 1,
wherein said first and second fingerprint prediction maps are radio frequency signal power maps; and
wherein said area is an interior building area.

17. A mobile wireless device, comprising:
means for receiving a set of fingerprint prediction maps and corresponding metrics, said fingerprint prediction maps including at least a first prediction map and a second prediction map, said metrics including a first metric corresponding to the first fingerprint prediction map indicating a probability that the first prediction map is currently valid and a second metric corresponding to the second fingerprint prediction map indicating a probability that the second prediction map is currently valid, said first and second fingerprint prediction maps corresponding to the same area but different sets of conditions;
a sensor module outputting a sensor reading;
means for updating the metrics and determining a position of the mobile wireless device based on said sensor reading, said means for updating the metrics and determining a position of the mobile wireless device updating said metrics including the first metric and the second metric based on a known current condition, said known current condition being an environmental condition, selecting a fingerprint prediction map in said set of fingerprint prediction maps having a highest probability of being valid as indicated by the updated metrics, and using the selected finger print map to determine a position of the mobile wireless device; and
means for updating at least one of the first or second metrics based on the result of said position determination.

18. The mobile wireless device of claim 17, wherein the first fingerprint prediction map corresponds to a first set of conditions and said second fingerprint prediction map corresponds to a second set of conditions, said first and second sets of conditions being different.

19. The mobile wireless device of claim 17, further comprising means for transmitting the at least one of the first or second metrics that was updated based on the result of said position determination to one of: another mobile wireless device or a network access point.

20. The mobile wireless device of claim 17, wherein said known current condition is one of: a time of day condition, day of week condition, weather condition, equipment on or off condition, mobile device density condition, a building condition, a door condition, or a window condition.

21. A computer program product for use in a mobile wireless device, the computer program product comprising:
a non-transitory computer readable medium comprising:
code for causing at least one computer to receive a set of fingerprint prediction maps and corresponding metrics, said fingerprint prediction maps including at least a first prediction map and a second prediction map, said metrics including a first metric corresponding to the first fingerprint prediction map indicating a probability that the first prediction map is currently valid and a second metric corresponding to the second fingerprint prediction map indicating a probability that the second prediction map is currently valid, said first and second fingerprint prediction maps corresponding to the same area but different sets of conditions;
code for causing said at least one computer to make a sensor reading;
code for causing said at least one computer to update the metrics and determine a position of the mobile wireless device based on said sensor reading, said code causing said at least one computer to update said metrics including the first metric and the second metric based on a known current condition, said known current condition being an environmental condition, select a fingerprint prediction map in said set of fingerprint prediction maps having a highest probability of being valid as indicated by the updated metrics, and use the selected finger print map to determine the position of the mobile device; and
code for causing said at least one computer to update at least one of the first or second metrics based on the result of said position determination.

22. A mobile wireless device comprising:
at least one processor configured to:
receive a set of fingerprint prediction maps and corresponding metrics, said fingerprint prediction maps including at least a first prediction map and a second prediction map, said metrics including a first metric corresponding to the first fingerprint prediction map indicating a probability that the first prediction map is currently valid and a second metric corresponding to the second fingerprint prediction map indicating a probability that the second prediction map is currently valid, said first and second fingerprint prediction maps corresponding to the same area but different sets of conditions;
make a sensor reading;

update said metrics including the first metric and the second metric based on a known current condition, said known current condition being an environmental condition;

select a fingerprint prediction map in said set of fingerprint prediction maps having a highest probability of being valid as indicated by the updated metrics;

determine, using the selected finger print map, a position of the mobile wireless device based on said sensor reading; and update at least one of the first or second metrics based on the result of said position determination; and memory coupled to said at least one processor.

23. The mobile wireless device of claim 22, wherein the first fingerprint prediction map corresponds to a first set of conditions and said second fingerprint prediction map corresponds to a second set of conditions, said first and second sets of conditions being different.

24. The mobile wireless device of claim 22, wherein said at least one processor is further configured to transmit the at least one of the first or second metrics that was updated based on the result of said position determination to one of: another mobile wireless device or a network access point.

25. The mobile wireless device of claim 22, wherein said known current condition is one of: a time of day condition, day of week condition, weather condition, equipment on or off condition, mobile device density condition, a building condition, a door condition, or a window condition.

* * * * *